(12) United States Patent
Inoue

(10) Patent No.: US 8,038,299 B2
(45) Date of Patent: Oct. 18, 2011

(54) LIGHT SOURCE APPARATUS, LIGHT SOURCE CONTROL METHOD, AND PROJECTOR APPARATUS

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 157 days.

(21) Appl. No.: 12/625,897

(22) Filed: Nov. 25, 2009

(65) Prior Publication Data

US 2010/0149496 A1     Jun. 17, 2010

(30) Foreign Application Priority Data

Dec. 17, 2008   (JP) ................................. 2008-321282

(51) Int. Cl.
  *G03B 21/00*  (2006.01)
  *G03B 21/28*  (2006.01)
  *G02F 1/00*  (2006.01)
  *G02F 1/33*  (2006.01)
  *H04N 5/74*  (2006.01)
(52) U.S. Cl. ............. 353/31; 353/99; 359/305; 348/754
(58) Field of Classification Search .................... 353/31, 353/94, 98–99, 122; 359/285–287, 305, 359/308–309; 348/742–743, 754, 769, 771; 385/7
See application file for complete search history.

(56) References Cited

U.S. PATENT DOCUMENTS

| | | | | |
|---|---|---|---|---|
| 4,084,182 A * | 4/1978 | Maiman | ........................ | 348/760 |
| 4,244,005 A * | 1/1981 | Jurgensen | ...................... | 348/769 |
| 4,851,918 A * | 7/1989 | Crowley | ........................ | 348/754 |
| 6,882,374 B2 | 4/2005 | Numakoshi | | |
| 7,474,286 B2 * | 1/2009 | Hajjar et al. | ..................... | 345/81 |
| 2003/0214633 A1* | 11/2003 | Roddy et al. | ..................... | 353/31 |
| 2007/0187580 A1* | 8/2007 | Kykta et al. | ............. | 250/227.15 |

FOREIGN PATENT DOCUMENTS

| | | |
|---|---|---|
| JP | 2002-333597 A | 11/2002 |
| JP | 2006-215468 A | 8/2006 |
| JP | 2006-220751 A | 8/2006 |
| JP | 2007-264575 A | 10/2007 |

OTHER PUBLICATIONS

Japanese Office Action dated Nov. 2, 2010 (and English translation thereof) in counterpart Japanese Application No. 2008-321282.

* cited by examiner

*Primary Examiner* — Georgia Y Epps
*Assistant Examiner* — Jori S Reilly-Diakun
(74) *Attorney, Agent, or Firm* — Holtz, Holtz, Goodman & Chick, P.C.

(57) ABSTRACT

A light source apparatus includes a light source emitting light, an optical deflection element deflecting and exciting the emitted light, and a light conversion member cyclically outputting source light components having a plurality of hues in accordance with irradiation positions in a time-sharing manner based on the irradiation using the light deflected by the optical deflection element.

6 Claims, 6 Drawing Sheets

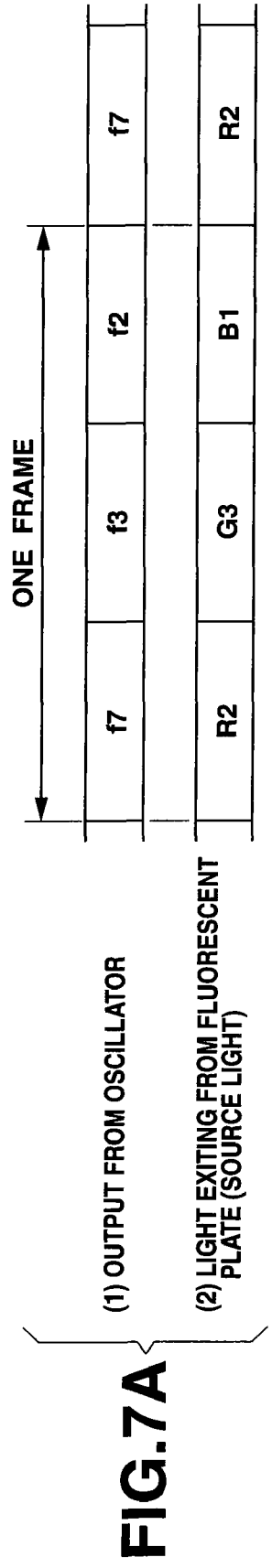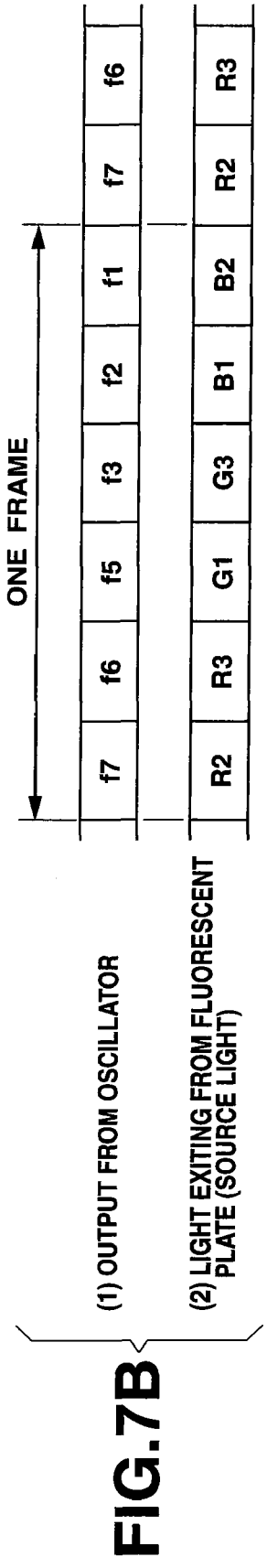

US 8,038,299 B2

LIGHT SOURCE APPARATUS, LIGHT SOURCE CONTROL METHOD, AND PROJECTOR APPARATUS

CROSS-REFERENCE TO RELATED APPLICATIONS

This application is based upon and claims the benefit of priority from prior Japanese Patent Application No. 2008-321282, filed Dec. 17, 2008, the entire contents of which are incorporated herein by reference.

BACKGROUND OF THE INVENTION

1. Field of the Invention

The present invention relates to a light source apparatus, a light source control method, and a projector apparatus.

2. Description of the Related Art

Various kinds of projector apparatuses each using a color wheel that selectively transmits or absorbs white light emitted from a light source lamp such as a high-pressure mercury lamp to emit respective primary color light components of red (R), green (G) and blue (B) in a time-sharing manner have been conventionally suggested (e.g., JP-A 2007-264575 [KOKAI]).

In a single-plate Digital Light Processor (DLP) (registered trademark) projector using a color wheel, which includes the technology disclosed in Patent Document described above, a color breakup phenomenon which is called a breaking phenomenon occurs. Further, in principle, suppressing this color breaking phenomenon is difficult as long as a rotating-disk type color wheel is used.

BRIEF SUMMARY OF THE INVENTION

A preferred embodiment of the present invention includes:
a light source emitting light;
an optical deflection element deflecting and exciting the emitted light; and
a light conversion member cyclically outputting source light components having a plurality of hues in accordance with irradiation positions in a time-sharing manner based on the irradiation using the light deflected by the optical deflection element.

BRIEF DESCRIPTION OF THE SEVERAL VIEWS OF DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 7A and 7B are views showing other examples of the oscillation signal of the oscillator and the source light exiting from the fluorescent plate according to the embodiment.

DETAILED DESCRIPTION OF THE INVENTION

A preferred embodiment for carrying out the present invention will now be described hereinafter with reference to the accompanying drawings. However, the embodiment described below has various restrictions that are technically desirable for carrying out the present invention, but the scope of the invention is not restricted to the following embodiment and illustrative examples.

A light source apparatus according to an embodiment of the present invention will now be described hereinafter with reference to the accompanying drawings.

Figure 1:
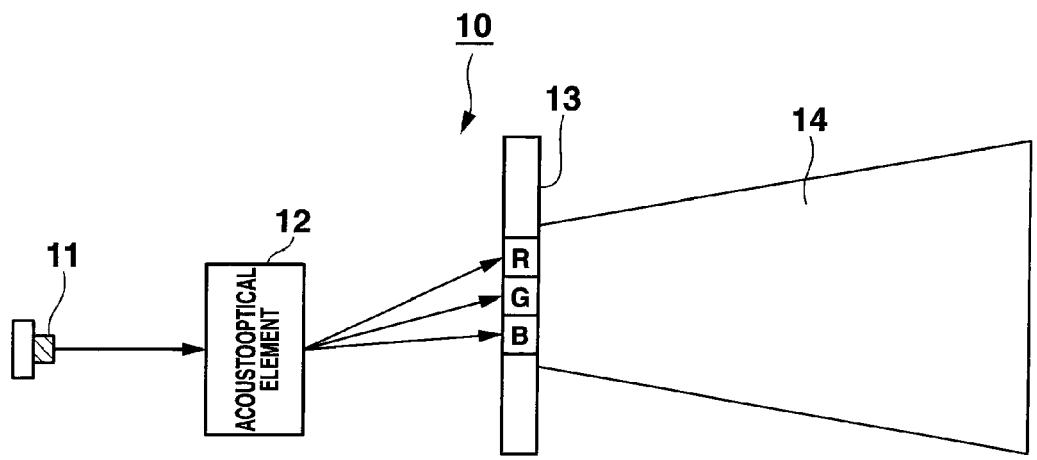
FIG. 1 is a view showing an outline configuration of a light source apparatus according to an embodiment of the present invention.

FIG. 1 shows an outline configuration of a light source apparatus 10 according to the embodiment, and a laser beam emitted from a semiconductor laser 11 enters an acoustooptical element 12 in this drawing.

This acoustooptical element 12 functions as a light deflection element, and it appropriately deflects incident light based on later-described traveling direction control and causes the deflected light to exit toward a fluorescent plate 13 as a light conversion member.

In this fluorescent plate 13, regions having a fluorescent body that produces visible light components in respective frequency bands of red (R), green (G) and blue (B) applied thereto are separately arranged in advance, and any one of the regions is selectively irradiated with the laser beam based on deflection in the acoustooptical element 12.

In the fluorescent plate 13, the fluorescent body applied to a position which is irradiated with the laser beam excites and diffuses light having a hue in a frequency band of any one of red, green and blue, and the excited and diffused light is led to an optical lens in a non-illustrated projector system through a light tunnel 14.

In this light tunnel 14, an entire inner wall surface is mirror-polished to uniform a density of the light excited and diffused by the fluorescent plate 13 and to diffusely reflect light propagated through the tunnel, and fine irregularities that prevent a quantity of exiting light from being attenuated are formed on this surface.

Figure 2:
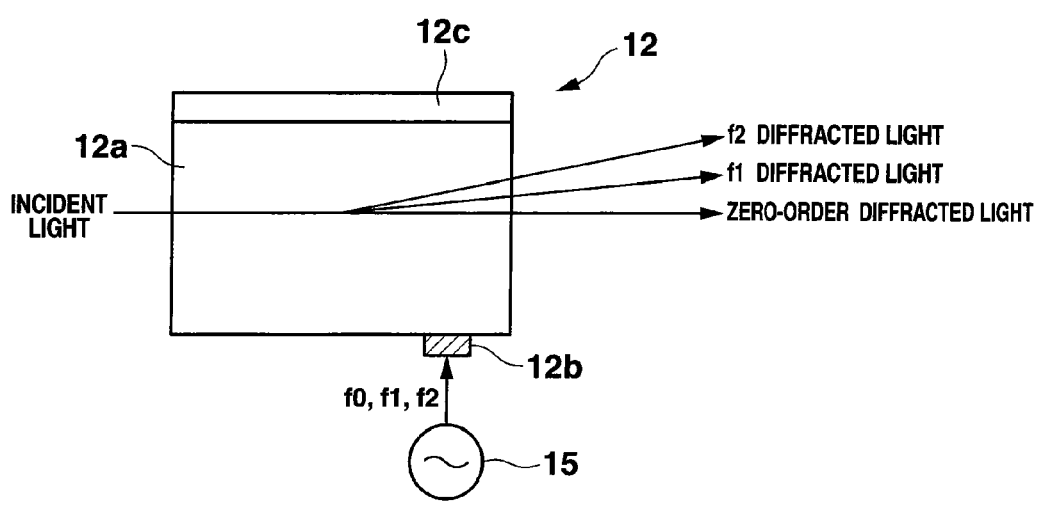
FIG. 2 is a view showing a principled configuration of an acoustooptical element according to the embodiment.

The principle of the acoustooptical element 12 as the light deflection element will now be described with reference to FIG. 2.

In the acoustooptical element 12, a piezoelectric element 12b is bonded to an acoustooptical medium 12a consisting of, e.g., a single crystal such as a tellurium dioxide (TeO2) or a molybdate (PbMoO4) or glass, an electrical signal is applied to this piezoelectric element 12b from an alternating-current oscillator 15 to generate ultrasonic waves, and the ultrasonic waves are propagated through the acoustooptical medium 12a.

An acoustic absorbent 12c is uniformly attached to a surface on an opposite side of the piezoelectric element 12b with the acoustooptical medium 12a sandwiched therebetween to prevent the ultrasonic waves from being reflected on an end surface of the acoustooptical medium 12a. When the laser beam is transmitted through the acoustooptical medium 12 through which the ultrasonic waves are propagated, the laser beam is diffracted by the acoustooptical effect. As this diffraction, there are isotropic diffraction and anisotropic Bragg diffraction that utilizes the crystal anisotropy, the latter anisotropic Bragg diffraction is utilized in this example to deflect the laser beam.

In the drawing, the respective fluorescent body positions of red, green and blue of the fluorescent plate 13 are irradiated with the laser beam based on zero-order diffracted light having a deflection angle of 0°, and f1 diffracted light and f2 diffracted light that are diffracted by ultrasonic waves having frequencies f1 and f2.

Specifically, a repetition frequency of emitted RGB light components can be set to 2,880 Hz by cyclically changing a frequency oscillated by the alternating-current oscillator 15 approximately every 115.7 μs. In this case, the following expression can be obtained:

$$1[s] \div 115.7[\mu s] \div 3[colors] = 2,880[Hz]$$
$$= 60[Hz] \times 48[\times speed]$$

Therefore, a single-plate DLP (registered trademark) projector or the like that can be driven at 48-times speed can be realized.

Figure 3:
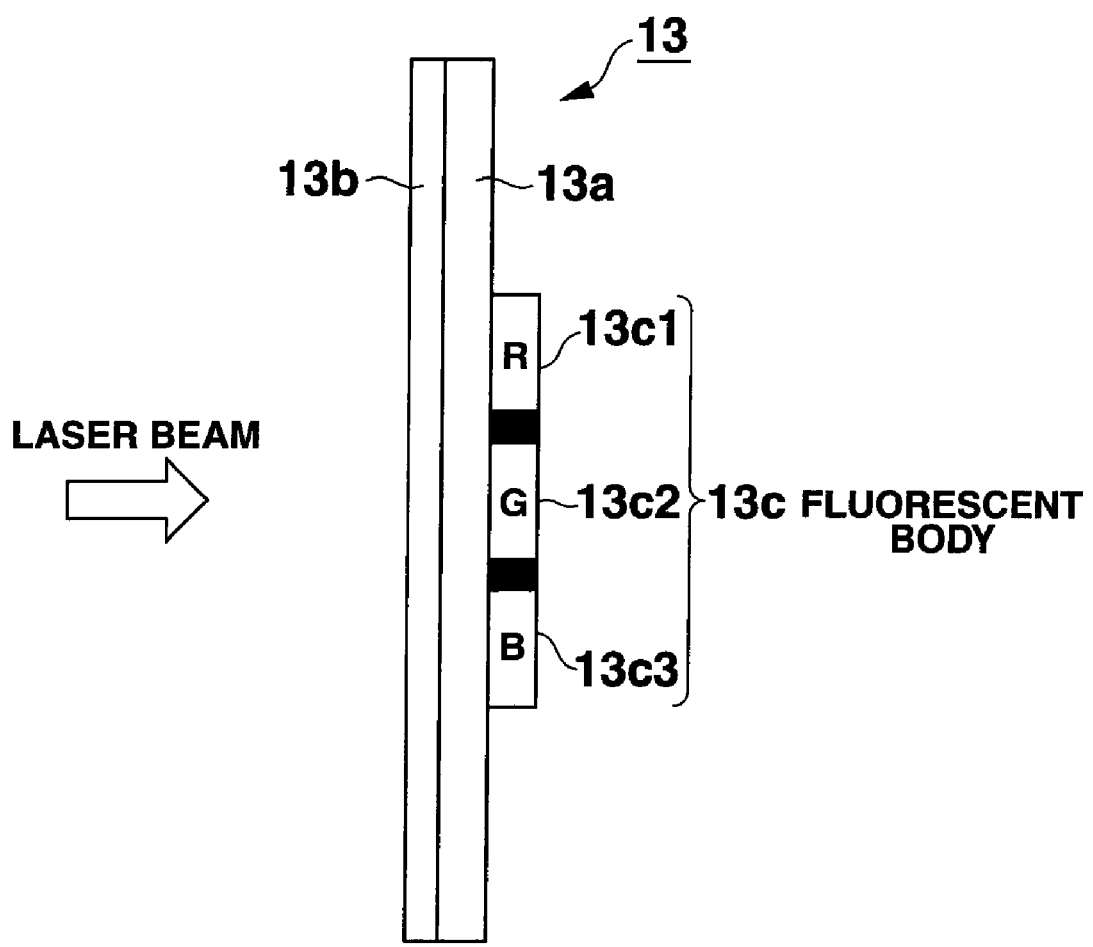
FIG. 3 is a view showing a configuration of a fluorescent plate according to the embodiment.

FIG. 3 shows a configuration of the fluorescent plate 13 that outputs source light of red, green and blue based on the laser beam from the acoustooptical element 12. The fluorescent plate 13 has a configuration that a dichroic filter 13b integrally covers an entire surface of a transparent substrate 13a on the acoustooptical element 12 side as a laser beam incidence side.

In addition to this configuration, a fluorescent body 13c including a red fluorescent region 13c1, a green fluorescent region 13c2, and a blue fluorescent region 13c3 is formed on a laser beam exit side of the transparent substrate 13a based on application of a fluorescent material.

As the dichroic filter 13b, a member having characteristics that can allow the laser beam to transmit therethrough and can reflect respective fluorescent light components of red, green and blue generated by the fluorescent body 13c is selected. As a result, the respective source light components of red, green and blue based on the fluorescence generated by the fluorescent body 13c all exit toward the light tunnel 14 side while diffusing.

A structural example when the light source apparatus 10 is applied to a single-plate DLP (registered trademark) type data projector apparatus will now be also described.

Figure 4:
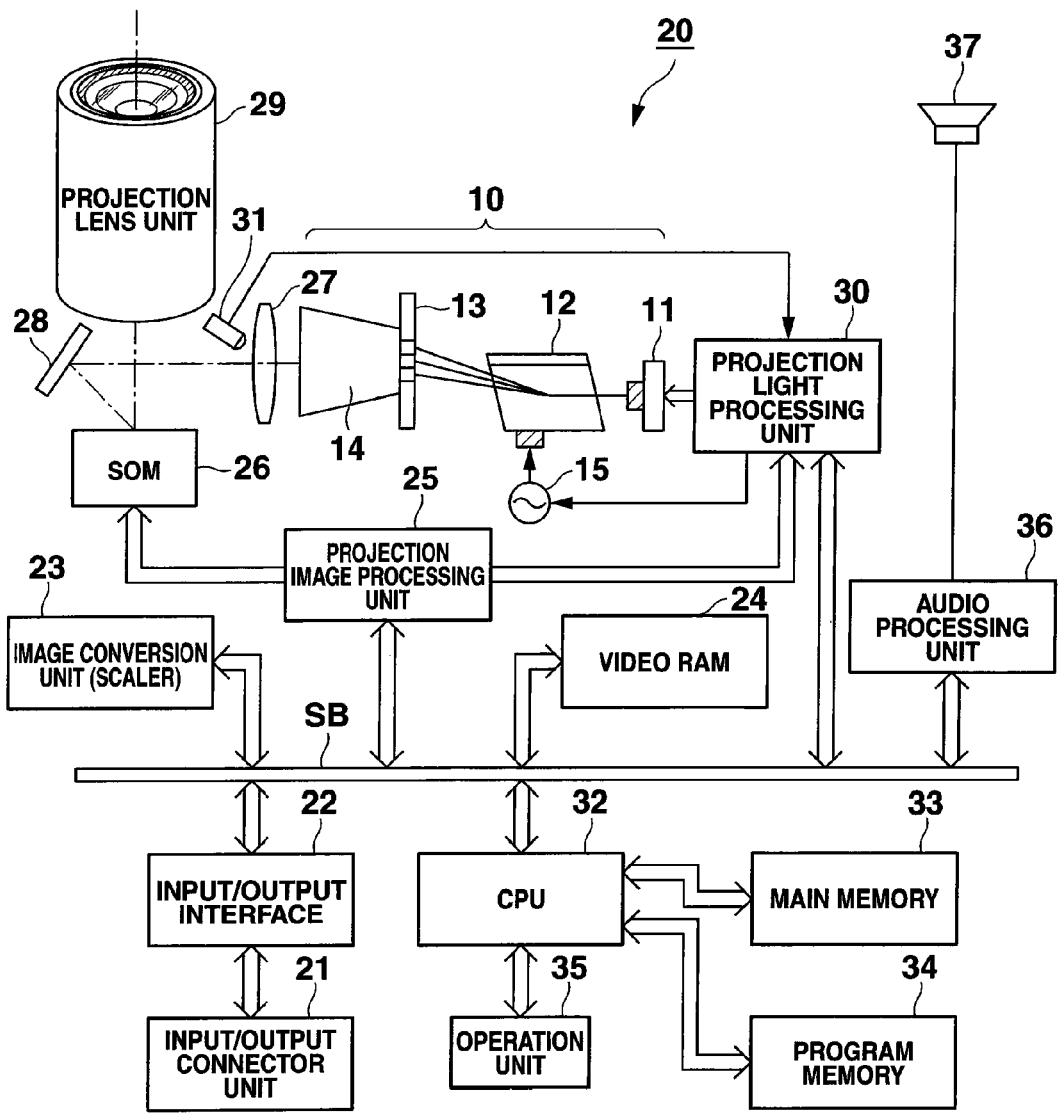
FIG. 4 is a block diagram showing an outline functional configuration of an electronic circuit included by a data projector apparatus according to the embodiment.

FIG. 4 is a block diagram showing an outline functional structure of an electronic circuit included in a data projector apparatus 20 according to the embodiment.

Reference number 21 denotes an input/output connector unit, and image signals based on various standards that are input from this input/output connector unit 21 are input to an image conversion unit 23 which is also called a scaler through an input/output interface 22 and a system bus SB. The image conversion unit 23 integrates input image signals as image signals having a projection format, stores such signals in a video RAM 24 as a buffer memory, and then transmits them to a projection image processing unit 25.

The projection image processing unit 25 uses each transmitted image signal to drive a micromirror element 26 as a spatial light modulation element (SOM) based on a frame rate conforming to a predetermined format, e.g., 60 frames/second, a division number for color components, and higher-speed time-sharing driving with a display gradation number being multiplied.

This micromirror element 26 forms an optical image based on reflected light by individually turning one-off at high speed respective inclination angles of a plurality of micromirrors that are arranged in an array and correspond to, e.g., XGA (1024 dots horizontally×768 dots vertically).

On the other hand, light emitted from the semiconductor laser 11 is deflected by the acoustooptical element 12 to be applied to the fluorescent body 13c of the fluorescent plate 13. Resultant fluorescent light is formed into a light flux having a uniform luminance distribution as source light by the light tunnel 14, then changed into parallel light by a light-source-system optical lens 27, and totally reflected by a mirror 28 to be applied to the micromirror element 26.

Further, an optical image is formed based on the light reflected by the micromirror element 26, and the formed optical image becomes a projection target through a projection lens unit 29. In this example, the projection target is projected and displayed on a non-illustrated screen.

A deflection angle of the acoustooptical element 12 is controlled by ultrasonic waves that are based on a frequency of an electrical signal from the alternating-current oscillator 15 as explained above. A projection light processing unit 30 drives oscillation of each of the semiconductor laser 11 and the alternating-current oscillator 15.

Furthermore, the projection light processing unit 30 receives a detection signal from an illuminance sensor 31 that detects a luminance of the source light exiting from the light-source-system optical lens 27. When this illuminance sensor 31 is used to detect brightness of the source light during a projecting operation and to perform feedback control, the brightness of the source light can be maintained constant.

A CPU 32 controls all operations of the respective circuits. This CPU 32 uses a main memory 33 constituted of a DRAM and a program memory 34 constituted of an electrically rewritable nonvolatile memory storing, e.g., an operating program or various kinds of fixed data to execute a control operation in this data projector apparatus 20.

The CPU 32 executes various kinds of projecting operations in accordance with a key operation signal from an operation unit 35.

Moreover, the CPU 32 is connected with an audio processing unit 36 through the system bus SB. The audio processing unit 36 converts audio data provided at the time of a projecting operation into analog data, drives a speaker unit 37 to perform amplification and audio generation, or generates, e.g., beeps as required.

Figure 5:
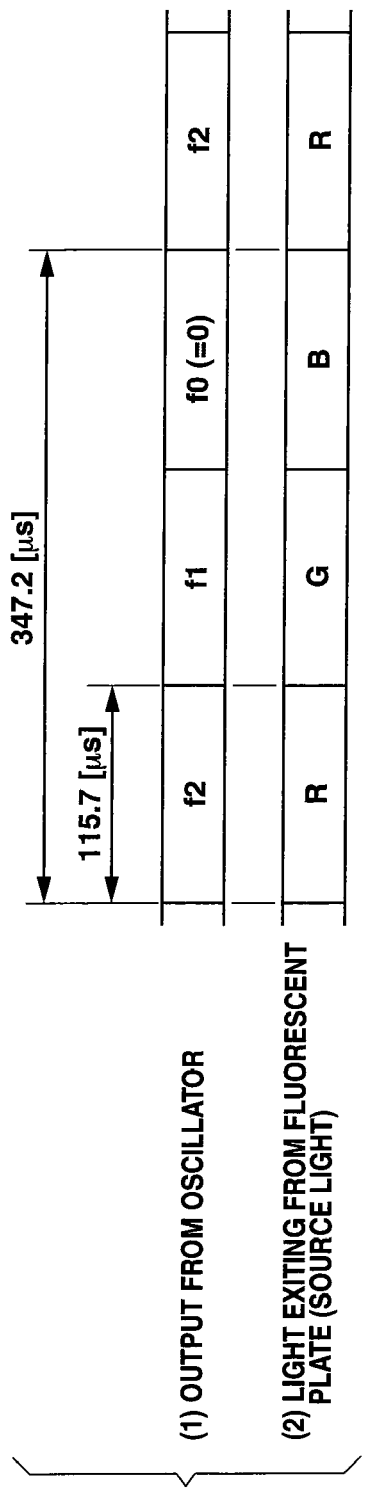
FIG. 5 is a view exemplifying an oscillation signal of an oscillator and source light exiting from the fluorescent plate according to the embodiment.

FIG. 5 shows an example of an electrical signal that is supplied to the piezoelectric element 12b of the acoustooptical element 12 by the alternating-current oscillator 15 and source light exiting from the fluorescent plate 13 as a result of exciting the laser beam by the acoustooptical element 12 based on this electrical signal and causing this laser beam to enter the fluorescent plate 13 in the above-described configuration.

In FIG. 5, as explained above, an oscillating frequency of the alternating-current oscillator 15 is switched to f2, f1, and f0 (=0 [no oscillation]) in the same cycle so that a field period of each of red, green and blue becomes approximately 115.7 [μs] and one RGB cycle has a triple value, i.e., approximately 347.2 [μs] in order to realize the 48-times speed.

As described above, according to this embodiment, since the source light having each RGB hue is output from the fluorescent plate 13 in the time-sharing manner by accurately switching an irradiation position on the fluorescent plate 13 based on the deflection by the acoustooptical element 12, a color breaking phenomenon which can be observed in a light source using a color wheel can be assuredly prevented from occurring.

Additionally, in the above-described embodiment, an individual difference that is specifically unevenness in fluorescence characteristics or positions of the red fluorescent region 13c1, the green fluorescent region 13c2, and the blue fluorescent region 13c3 of the fluorescent body 13c constituting the fluorescent plate 13 can be adjusted in a pseudo manner by adjusting a frequency of a signal that is supplied to the piezoelectric element 12b of the acoustooptical element 12 by the projecting light processing unit 30.

Figure 6:
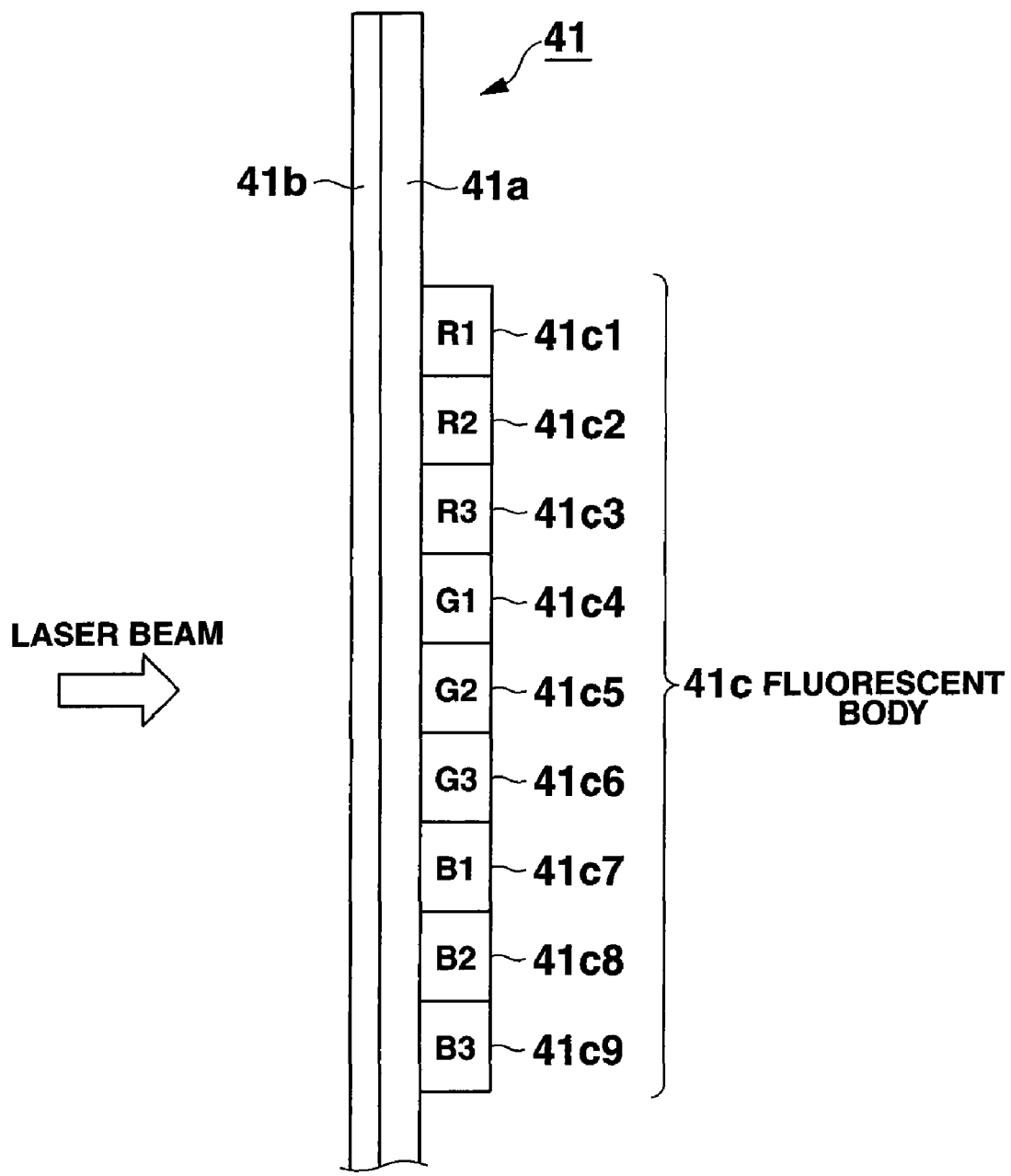
FIG. 6 is a view exemplifying another configuration of the fluorescent plate according to the embodiment.

FIG. 6 shows a configuration of a fluorescent plate 41 that can substitute for the fluorescent plate 13. The fluorescent plate 41 has a configuration that a dichroic filter 41b integrally covers an entire surface of a transparent substrate 41a on an acoustooptical element 12 side that is a laser beam incidence side.

In addition to this configuration, a fluorescent body 41c including an R1 fluorescent region 41c1, an R2 fluorescent region 41c2, an R3 fluorescent region 41c3, a G1 fluorescent region 41c4, a G2 fluorescent region 41c5, a G3 fluorescent region 41c6, a B1 fluorescent region 41c7, a B2 fluorescent region 41c8, and a B3 fluorescent region 41c9 is formed on a laser beam exit side of the transparent substrate 41a by application of a fluorescent material.

Here, the R1 fluorescent region 41c1, the R2 fluorescent region 41c2, and the R3 fluorescent region 41c3 are formed by applying fluorescent bodies which have the same hue (red [R]) but have different luminosity values to be adjacent to each other, and the order of their luminosity values is assumed to be "R1>R2>R3", for example.

Likewise, the G1 fluorescent region 41c4, the G2 fluorescent region 41c5, and the G3 fluorescent region 41c6 are formed by applying fluorescent bodies which have the same hue (green [G]) but have different luminosity values to be adjacent to each other, and the order of their luminosity values is assumed to be "G1>G2>G3", for example.

Likewise, the B1 fluorescent region 41c7, the B2 fluorescent region 41c8, and the B3 fluorescent region 41c9 are formed by applying fluorescent bodies which have the same hue (blue [B]) but have different luminosity values to be adjacent to each other, and the order of their luminosity values is assumed to be "B1>B2>B3", for example.

When using the fluorescent plate 41 having such a configuration, an alternating-current oscillator 15 can arbitrarily apply a laser beam to respective fluorescent body positions R1 to R3, G1 to G3, and B1 to B3 of the fluorescent plate 41 based on zero-order diffracted light having a deflection angle of 0° and f1 diffracted light to f8 diffracted light defected based on ultrasonic waves having frequencies f1 to f8.

FIG. 7A exemplifies an electrical signal that is supplied to the piezoelectric element 12b of the acoustooptical element 12 by the alternating-current oscillator 15 and source light that exits from the fluorescent plate 41 as a result of exciting a laser beam by the acoustooptical element 12 based on this electrical signal and causing the excited signal to enter the fluorescent plate 41.

In FIG. 7A, the alternating-current oscillator 15 selectively supplies to the piezoelectric element 12b of the acoustooptical element 12 frequency f7 to select R2 from the fluorescent body positions R1 to R3, frequency f3 to select G3 from the fluorescent body positions G1 to G3, and frequency f2 to select B1 from the fluorescent body positions B1 to B3.

As a result, an individual difference in the fluorescent plate 41 can be adjusted based on electrical adjustment alone, which is selection of a frequency of the electrical signal that is supplied to the piezoelectric element 12b of the acoustoop-tical element 12 by the alternating-current oscillator 15, while omitting mechanical adjustment, thereby realizing ideal light-emitting characteristics.

Furthermore, one fluorescent body position is selected in the respective fields of red, green and blue for projecting one frame of an image in the description of FIG. 7A, but switching a plurality of fluorescent bodies having the same hue in one field enables realizing a light source having an intermediate luminosity value.

In FIG. 7B, the alternating-current oscillator 15 selectively supplies to the piezoelectric element 12b of the acoustooptical element 12 frequency f7 to select the fluorescent body of R2 in a first half of a red field, frequency f6 to select the fluorescent body of R3 in a last half of the same, frequency f5 to select the fluorescent body of G1 in a first half of a green field, frequency f3 to select the fluorescent body of G3 in a last half of the same, frequency f2 to select the fluorescent body of B1 in a first half of a blue field, and frequency f1 to select the fluorescent body of B1 in a last half of the same, respectively.

As a result, in the respective fields of red, green and blue, source light having an intermediate value of individual luminosity values provided as the fluorescent body 41c can be obtained as an effective value, and an influence of an individual difference of the fluorescent plate can be eliminated, thus realizing more ideal light-emitting characteristics.

Moreover, in FIG. 7B, the fluorescent bodies are switched in accordance with the first half and the last half in the same field to obtain the source light having the luminosity value as the intermediate value, but an arbitrary value can be selected between luminosity values of the two fluorescent bodies by adjusting a timing for switching the fluorescent bodies in the field and variably setting a time with of the fluorescent body that is selected first and that of the fluorescent body that is selected next.

Therefore, providing a plurality of fluorescent bodies having the same hue and greatly different luminosity values to the fluorescent body 41c enables realizing a light source having arbitrary necessary light-emitting characteristics.

It is to be noted that the description has been given as to the example where the present invention is applied to the DLP type data projector apparatus, but the present invention is not restricted thereto, and it can be likewise applied to a light source apparatus such as a rear-projection type television receiver or a color scanner apparatus.

Besides, the present invention is not restricted to the foregoing embodiment, and it can be modified in many ways on an embodying stage without departing from the scope of the invention. Additionally, functions performed in the foregoing embodiment may be appropriately combined to be carried out. The foregoing embodiment includes various stages, and a variety of inventions can be extracted by appropriately combining a plurality of disclosed constituent requirements. For example, even if some of all constituent requirements disclosed in the embodiment are deleted, a configuration from which such constituent requirements are deleted can be extracted as an invention as long as an effect can be obtained.

What is claimed is:

1. A light source apparatus comprising:
  a light source, comprising a semiconductor laser, which emits light;
  an optical deflection element, comprising an acoustooptical element, which deflects and excites the emitted light;
  a light conversion member, comprising a fluorescent plate configured to output RGB source light, which has a plurality of positional regions having different luminosity values in accordance with a plurality of hues, and which cyclically outputs source light components having the plurality of hues in a time-sharing manner in accordance with irradiation positions of the light deflected by the optical deflection element; and an optical deflection adjustment unit which selects a deflection angle that is excited by the optical deflection element in accordance with a positional region having an arbitrary luminosity value in accordance with each hue.

2. The apparatus according to claim 1, wherein the optical deflection adjustment unit selects the deflection angle that is excited by the optical deflection element by continuously switching the plurality of positional regions having the arbitrary luminosity values in a same cycle in accordance with the respective hues.

3. The apparatus according to claim 2, wherein the optical deflection adjustment unit selects the deflection angle that is excited by the optical deflection element by continuously switching the plurality of positional regions having the arbitrary luminosity values based on arbitrary time widths in the same cycle in accordance with the respective hues.

4. The apparatus according to claim 1, wherein the light conversion member has a dichroic filter on an entire surface of the light conversion member on the optical deflection element side as an incidence side of the light.

5. A light source control method comprising:

driving an optical deflection element, comprising an acoustooptical element, which deflects light from a light source, which comprises a semiconductor laser, with a predetermined frequency to excite light exiting from the optical deflection element with respect to a light conversion member, which comprises a fluorescent plate configured to output RGB source light, which has a plurality of positional regions having different luminosity values in accordance with a plurality of hues, and which selectively outputs source light components having the plurality of hues in accordance with positions at which the light is applied;

irradiating the light conversion member with the exiting light;

cyclically outputting the source light components having the plurality of hues from the light conversion member in a time-sharing manner; and executing adjustment to select a deflection angle that is excited by the optical deflection element in accordance with a positional region having an arbitrary luminosity value in accordance with each hue.

6. A projector apparatus comprising:

the light source apparatus of claim 1;

a display element;

a light guide optical unit which guides light from the light source apparatus to the display element;

a projection optical unit which projects an image exiting from the display element; and a control unit which controls the light source apparatus and the display element.

* * * * *